(12) United States Patent
Aggarwal et al.

(10) Patent No.: US 8,914,371 B2
(45) Date of Patent: Dec. 16, 2014

(54) EVENT MINING IN SOCIAL NETWORKS

(75) Inventors: Charu Aggarwal, Hawthorne, NY (US); Karthik Subbian, Falcon Heights, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/324,513

(22) Filed: Dec. 13, 2011

(65) Prior Publication Data
US 2013/0151522 A1 Jun. 13, 2013

(51) Int. Cl.
*G06F 7/00* (2006.01)

(52) U.S. Cl.
USPC .......................................... 707/737

(58) Field of Classification Search
CPC .................... G06F 17/30265; G06F 17/30598; G06F 17/30699; G06F 17/30516; G06F 17/3071; G06F 17/30705; G06F 17/30029; G06F 17/30867; G06F 17/30038; G06F 21/552; G06F 2201/81; G06F 2201/86; G06F 9/542; G06F 21/554
USPC ................................... 707/737, 754, 999.107
See application file for complete search history.

(56) References Cited

U.S. PATENT DOCUMENTS

| 6,804,688 | B2 | 10/2004 | Kobayashi |
| 6,907,426 | B2 | 6/2005 | Hellerstein et al. |
| 8,073,963 | B1 * | 12/2011 | Wechsler et al. ............. 709/231 |
| 8,171,128 | B2 * | 5/2012 | Zuckerberg et al. .......... 709/224 |
| 2004/0027349 | A1 | 2/2004 | Landau et al. |
| 2007/0050388 | A1 | 3/2007 | Martin |
| 2007/0226212 | A1 * | 9/2007 | Aggarwal et al. ................. 707/6 |
| 2007/0294716 | A1 * | 12/2007 | Jeong et al. ..................... 725/19 |
| 2008/0107159 | A1 * | 5/2008 | Gossett et al. ................ 375/150 |
| 2008/0294684 | A1 | 11/2008 | Chi et al. |
| 2010/0119053 | A1 * | 5/2010 | Goeldi ..................... 379/265.09 |
| 2010/0223276 | A1 | 9/2010 | Al-Shameri et al. |
| 2010/0262599 | A1 | 10/2010 | Nitz |
| 2010/0299132 | A1 | 11/2010 | Dolan |
| 2010/0306249 | A1 * | 12/2010 | Hill et al. ...................... 707/769 |
| 2011/0004831 | A1 * | 1/2011 | Steinberg et al. ............. 715/753 |

(Continued)

FOREIGN PATENT DOCUMENTS

| CN | 101174273 A | 5/2008 |
| CN | 101571853 A | 11/2009 |
| CN | 102110140 A | 6/2011 |
| EP | 2216743 A1 | 8/2010 |

OTHER PUBLICATIONS

Xie, et al. "Event Mining in Multimedia Streams," Proceedings of the IEEE, vol. 96, No. 4, Apr. 2008.

(Continued)

*Primary Examiner* — Mohammed R Uddin
(74) *Attorney, Agent, or Firm* — Jeff Tang

(57) ABSTRACT

A method and system for detecting an event from a social stream. The method includes the steps of: receiving a social stream from a social network, where the social stream includes at least one object and the object includes a text, sender information of the text, and recipient information of the text; assigning said object to a cluster based on a similarity value between the object and the clusters; monitoring changes in at least one of the clusters; and triggering an alarm when the changes in at least one of the clusters exceed a first threshold value, where at least one of the steps is carried out using a computer device.

15 Claims, 11 Drawing Sheets

(56) References Cited

U.S. PATENT DOCUMENTS

| | | | |
|---|---|---|---|
| 2011/0029636 A1 | 2/2011 | Smyth et al. | |
| 2011/0099142 A1 | 4/2011 | Karjalainen et al. | |
| 2011/0154223 A1* | 6/2011 | Whitnah et al. | 715/753 |
| 2011/0161987 A1* | 6/2011 | Huang et al. | 719/318 |
| 2011/0246463 A1* | 10/2011 | Carson et al. | 707/737 |
| 2011/0302123 A1* | 12/2011 | Nista et al. | 706/52 |
| 2012/0072428 A1* | 3/2012 | Kao et al. | 707/748 |
| 2012/0131139 A1* | 5/2012 | Siripurapu et al. | 709/217 |
| 2012/0239485 A1* | 9/2012 | Hu et al. | 705/14.36 |
| 2012/0290950 A1* | 11/2012 | Rapaport et al. | 715/753 |
| 2013/0031489 A1* | 1/2013 | Gubin et al. | 715/753 |
| 2013/0046770 A1* | 2/2013 | Tseng | 707/748 |

OTHER PUBLICATIONS

C.C. Aggarwal. Data Streams: Models and Algorithms, Springer, 2007.

J. Allan, R. papka, V. Lavrenko. Online new event detection and tracking. ACM SIGIR, 1998.

J. Allan, V. Lavrenko, H. Jin. First story detection in tdt is hard. ACM CIKM, 1998.

T. Brants, F. Chen, A. Farahat. A system for new event detection. ACM SIGIR, 2003.

D. Chakrabarti, R. Kumar, and A. Tomkins, Evolutionary clustering, KDD Conference, pp. 554-560, 2006.

Y. Chi, X. Song, D. Zhou, K. Hino, and B. L. Tseng, Evolutionary spectral clustering by incorporating temporal smoothness, KDD Conf., pp. 153-162, 2007.

M.-S. Kim and J. Han, A particle-and-density based evolutionary clustering method for dynamic networks, PVLDB, 2(1), pp. 622-633, 2009.

A. Kontostathis, L. Galitsky, W. M. Pottenger, S. Roy, D. J. Phelps. A survey of emerging trend detection in textual data mining. Survey of Text Mining, pp. 185-224, 2003.

Q. Mei, C.-X. Zhai. Discovering Evolutionary Theme Patterns from Text—An Exploration of Temporal Text Mining, ACM KDD Conference, 2005.

G. Salton. An Introduction to Modern Information Retrieval, Mc. Graw Hill, 1983.

G. Cormode, S. Muthukrishnan, An Improved Data-Stream Summary: The Count-min Sketch and its Applications. Journal of Algorithms, 55(1), 2005.

UK Examination Report under Section 18(3), Jun. 3, 2014, Application No. GB1408192. 3 pp.

* cited by examiner

Algorithm *SocialStreamClustering*(NumClusters: $k$);
begin
  Initialize clusters $C_1 \ldots C_r$ to null;
  Initialize $i, \mu, \sigma, M_0, M_1, M_2$ to 0;
  repeat
    $i = i + 1$;
    receive next social stream object $S_i$;
    for each cluster $C_l$ compute
    the value of $Sim(S_i, C_l)$;
    Let $r$ be the index of cluster $C_r$ with
      the largest similarity to $S_i$;
    if $(Sim(S_i, C_r) < \mu - 3 \cdot \sigma)$ then
      replace most stale cluster with a new cluster
      containing the single point $C_r$;
      else add $S_i$ to $C_r$ and update
        statistics $\psi_r(C_r)$ of cluster $C_r$;
    update $M_0, M_1, M_2$ additively;
    $\mu = M_1/M_0$;
    $\sigma = \sqrt{M_2/M_0 - \mu^2}$;
  until(*end_of_stream*);
end

FIG. 6

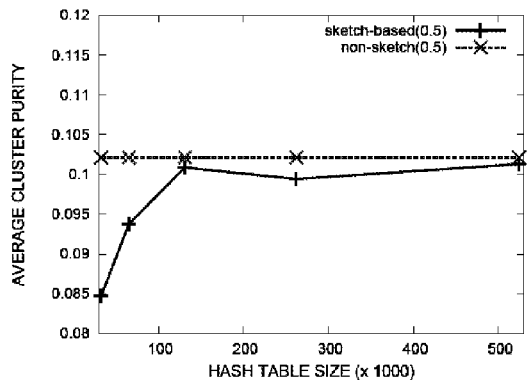
(e) Hash Table Length
Sensitivity (*Twitter*)
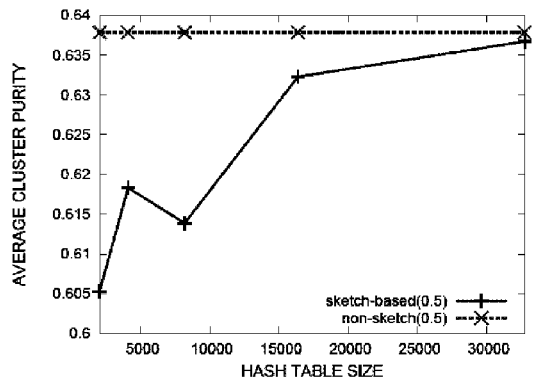
(f) Hash Table Length
Sensitivity (*Enron*)
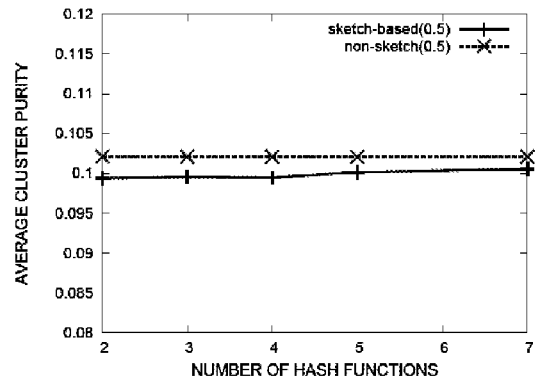
(g) Hash Table Width
Sensitivity (*Twitter*)
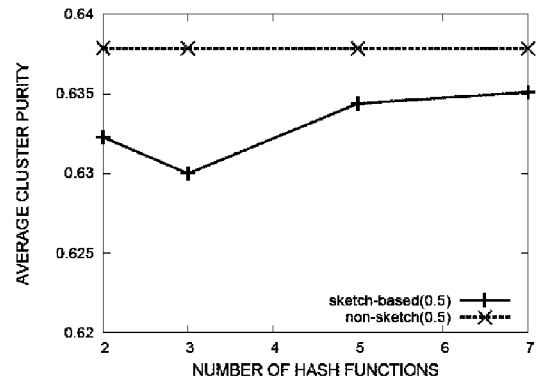
(h) Hash Table Width
Sensitivity (*Enron*)
FIG. 7 (continued)

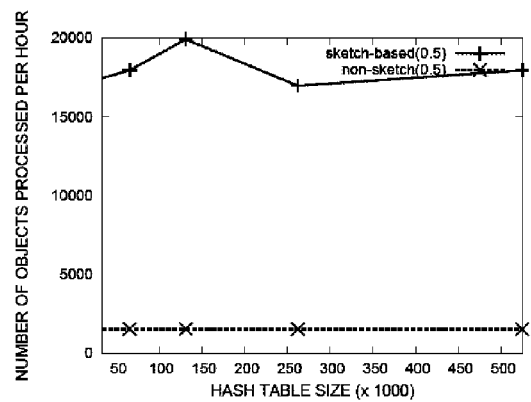
(e) Hash Table Length
Sensitivity (*Twitter*)
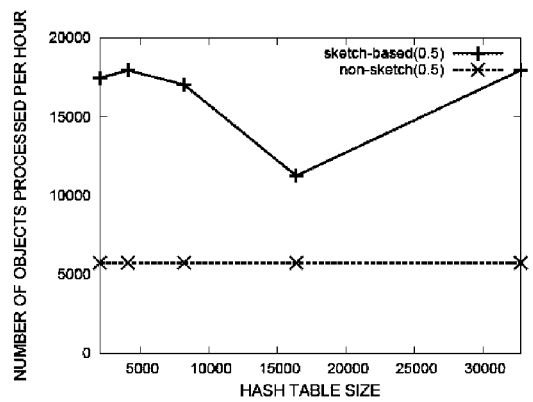
(f) Hash Table Length
Sensitivity (*Enron*)
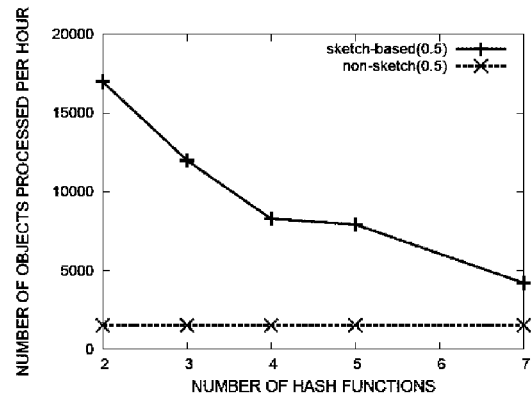
(g) Hash Table Width
Sensitivity (*Twitter*)
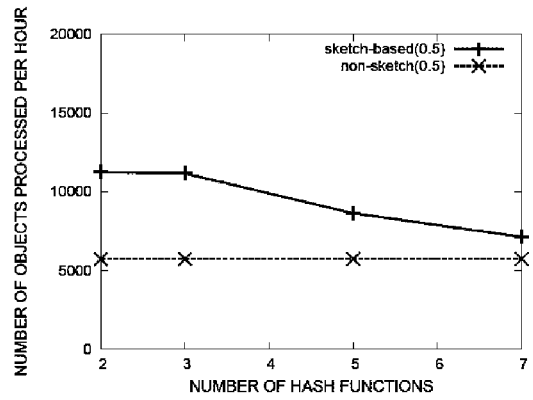
(h) Hash Table Width
Sensitivity (*Enron*)
FIG. 8 (continued)

Supervised Event Detection
(Japan Nuclear Crisis)

EVENT MINING IN SOCIAL NETWORKS

BACKGROUND OF THE INVENTION

1. Field of the Invention

The present invention relates to event mining and, more particularly, detecting new events from a social stream.

2. Description of Related Art

The problem of text mining has been widely studied in the information retrieval community because of the ubiquity of text data availability in a wide variety of scenarios such as the web, social networks, news feeds and many others. Much of the text data arises in the context of temporal applications such as news feeds and social network streams, in which the text arrives as a continuous and massive stream of documents. Streaming applications present a special challenge to such problems because of the fact that it is often necessary to process the data in a single pass and one cannot store all the data on disk for re-processing.

An important problem in the context of temporal and streaming text data is that of online event detection, which is closely related to the problem of topic detection and tracking. This problem is also closely related to stream partitioning, and attempts to determine new topical trends in the text stream and their significant evolution. The idea is that important and newsworthy events in real life (such as the recent unrest in the middle east) are often captured in the form of temporal bursts of closely related documents in a social stream. The problem can be proposed in both the supervised and unsupervised scenarios. In the unsupervised case, it is assumed that no training data is available in order to direct the event detection process of the stream. In the supervised case, prior data about events is available in order to guide the event detection process.

SUMMARY OF THE INVENTION

Accordingly, one aspect of the present invention provides a method for detecting an event from a social stream. The method includes the steps of: receiving a social stream from a social network, where the social stream includes at least one object and the object includes a text, sender information of the text, and recipient information of the text; assigning said object to a cluster based on a similarity value between the object and the clusters; monitoring changes in at least one of the clusters; and triggering an alarm when the changes in at least one of the clusters exceed a first threshold value, where at least one of the steps is carried out using a computer device.

Another aspect of the present invention provides a system that detects an event from a social stream. The system includes: a receiving module for receiving a social stream from a social network, where the social stream includes at least one object and the object includes a text, sender information of the text, and recipient information of the text; a cluster module for assigning said object to a cluster based on a similarity value between the object and the clusters; a monitoring module for monitoring changes in at least one of the clusters; and a trigger module for triggering an alarm when the changes in at least one of the clusters exceed a first threshold value.

BRIEF DESCRIPTION OF THE DRAWINGS

FIG. 6 shows detailed overall algorithm for cluster maintenance according to another preferred embodiment of the present invention.

DETAILED DESCRIPTION OF THE PREFERRED EMBODIMENTS

Figure 1:
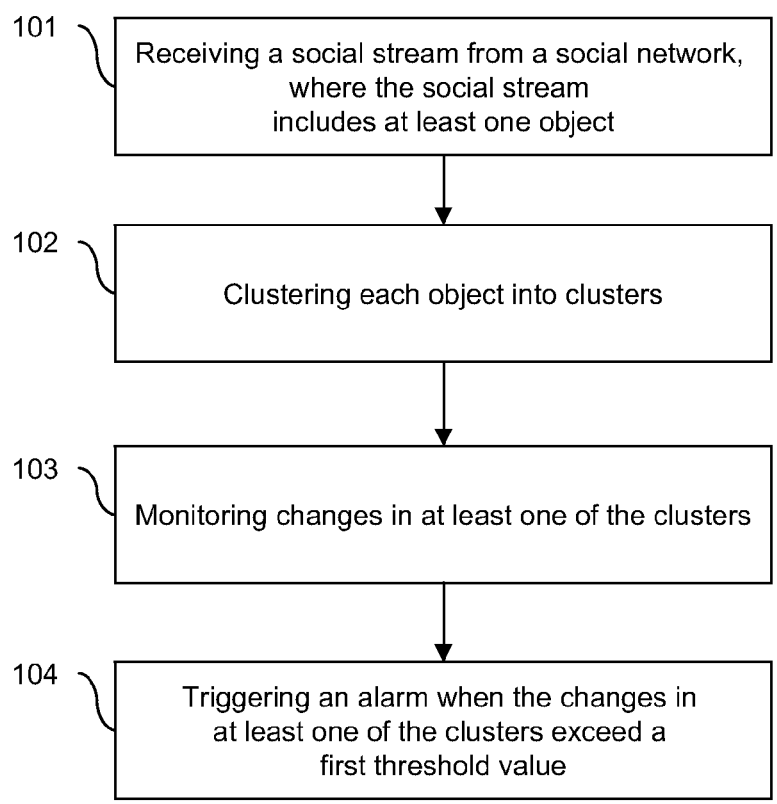
FIG. 1 shows a flow chart illustrating method 100 of detecting an event in a social network according to a preferred embodiment of the present invention.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer. Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

A social network is a social structure made up of actors (or organizations) called "nodes", which are tied (connected) by one or more specific types of interdependency, such as friendship, kinship, common interest, financial exchange, dislike, sexual relationships, or relationships of beliefs, knowledge or prestige. The social network can further include the messages in an online chat messenger service, or it can include an email network in which messages are sent between pairs of nodes.

A number of interesting issues arise in such social networks, because they are dynamic, and are associated with network structure in the stream. Each node represents an actor in the social network, and each message sent in the social network is the text content associated with an edge in the social network. Clearly, multiple messages can be sent between the same pair of nodes over time. In this case, the topical content of the documents, their temporal distribution, and the graphical structure of the dynamic network of interactions can be used to detect interesting events and their evolution. Messages which are sent between a tightly knit group of nodes can be more indicative of a particular event of social interest, than a set of messages which are more diffusely related from a structural point of view. Such messages are structurally well connected, when the social network is viewed as a graph that has the edges corresponding to the messages sent between entities. This is related to the problem of community detection, in which a key issue is to find structurally connected regions of the social network. At the same time, the content and topics of the documents should also play a strong role in the event detection process.

The network locality of the event can play a key role in its significance. For example, a major event which is specific to a particular university can correspond to messages primarily within the students and faculty members of that university, whereas a more global event such as Mideast Unrest can correspond to content related messages with a larger locality of the social network. In the former case, the communications are likely to occur between the more closely connected group of entities, while in the latter case, the messages can be more global, with a bias towards a locality of the social network corresponding to the mid east. The ability to detect such different events with different levels of locality and scales in a dynamic network is extremely challenging in massive and large scale social networks.

A key issue in the streaming scenario is that it is assumed that the data cannot be stored on disk for repeated processing because of the memory and storage limitations for handling such high volume streams. In other words, all partitioning or event detection algorithms must be executed with the one-pass streaming assumption, in which only (storage-constrained) summary data can be extracted from the incoming stream, after which the raw stream is lost. Furthermore, the algorithm must be fast, as it should be able to detect the events from the massive volume of the social network stream in real time. Therefore, the key challenges for event detection in social streams are as follows: (a) The ability to use both the content and the (graphical) structure of the interactions for event detection. (b) The ability to use temporal information in the event detection process. For example, a new trend of closely related text documents from a structural and content point of view, which have not been encountered earlier can correspond to a new event in the social stream. (c) The ability to handle very large and massive volumes of text documents under one-pass constraint of streaming scenarios.

The problem of determining events in streams is closely related to the problem of stream partitioning for which a number of methods have been proposed for different kinds of data. In the context of social networks, the content of such streams is text. An event in such a text stream is essentially the beginning of a new pattern of activity, which can be modeled as the starting point of a new cluster in the data. A number of such methods have been proposed in the context of topic detection and tracking by the text mining community. This is also related to the problem of partitioning and topic modeling in dynamic text stream.

However, in social networks, there is a rich amount of structure available in determining the key events in the network. For example, an event corresponding to Mideast Unrest can often correspond to text streams exchanged between members who are closely linked to one another based on geographical proximity. While the use of linkages in order to determine clusters and patterns has been widely studied by the social networking community, these methods are typically designed for static networks. Some partitioning methods have recently also been designed for dynamic networks, though they do not use the content of the underlying network for the mining process. On the other hand, some recent methods for pattern discovery in networks use both content and structure, though these methods are not defined for the problem of event detection in the temporal scenario. Therefore, we design a method which can use the content, structural and temporal information in a holistic way in order to detect relevant clusters and events in social streams, where the method can solve the unique challenge of determining key events in the network.

FIG. 1 illustrates a flow chart including method steps according to one embodiment of the present invention. At step 101, a social stream is received from a social network, where the social stream includes at least one object. As mentioned above, a social network is a social structure made up of actors (or organizations) called "nodes", which are tied (connected) by one or more specific types of interdependency, such as friendship, kinship, common interest, financial exchange, dislike, sexual relationships, or relationships of beliefs, knowledge or prestige. Social network can further include messages in an online chat messenger service, or it can include an email network in which messages are sent between pairs of nodes. Social network generates a social stream, where the social stream includes a continuous and temporal sequence of objects $S_1 \ldots S_r, \ldots$, such that each object $S_i$ corresponds to a content-based interaction between social entities, and contains explicit content information and linkage information between entities. The object $S_i$ includes a text document $T_i$ that corresponds to the content of the interaction of an entity in the social network with one or more other entities. The object $S_i$ further includes an origination node $q_i \in N$ which is the sender of the message $T_i$ to other nodes. The object $S_i$ lastly includes a set of one or more receiver nodes $R_i \subseteq N$, which correspond to all recipients of the message $T_i$ from node $q_i$. Thus, the message $T_i$ is sent from the origination node $q_i$ to each node $r \in R_i$. It is assumed that each edge $(q_i, r)$ belongs to the set A.

Object in step 101, namely $S_i$, is represented by the tuple $(q_i, R_i, T_i)$. It should be noted that the above definition of the social stream captures a number of different natural scenarios in different types of social networks. For example, in the Twitter social network, the document $T_i$ corresponds to the content of the tweet, and the node $q_i$ corresponds to the tweeting actor. The set $R_i$ corresponds to the recipients of the tweet. An email interaction network can also be considered a social network with an exactly similar interpretation to the above. A similar argument applies to chat interaction networks. In many of these cases, the receiver set $R_i$ can contain only one node, as a result of which there is a stream of content-based edge interactions. Finally, in many social networks, a posting on the wall of one actor to another corresponds to an edge with the document $T_i$ corresponding to the content of the posting.

The social stream in step 101 typically contains rich information about the trends which can lead to changes both in the content and the structural locality of the network in which the interactions can occur. The embodiments of the present invention begin with describing an unsupervised technique for event detection, which continuously characterizes the incoming interactions in the form of clusters, and leverages them in order to report events in the data stream.

After receiving the social stream from social network, step 102 in FIG. 1 performs partitioning of received social stream, where further details of step 102 will be described later. The objects from the social stream, $S_1 \ldots S_r$, are continuously partitioned into k clusters $C_1 \ldots C_k$, such that each object $S_i$ belongs to at most one of the clusters $C_r$. Furthermore, the objects are assigned to different clusters with the use of a similarity value which captures both the content of the interchanged messages, and the dynamic social network structure implied by the different messages. The computation of the similarity value will be provided in further detail in FIG. 4.

The clusters are created by utilizing both the content and linkage information. Since the clusters are created dynamically, they can change considerably over time, as the stream evolves, and new points are added to the clusters. Furthermore, in some cases, an incoming object can be different enough from the current clusters. In that case, it can be put into a cluster of its own, and one of the current clusters can be removed from the set $C_1 \ldots C_k$. Such an event can be an interesting one, especially if the newly created cluster starts a new pattern of activity in which more stream objects are subsequently added. At the same time, in some cases, the events can not be entirely new, but can correspond to significant changes in the patterns of the arriving objects in terms of their relative distribution to clusters.

At step 103, changes in the clusters are monitored in at least one of the clusters. In the present embodiment of the invention, there are two types of new events, which are referred to as novel events and evolution events in order to describe these different scenarios. The arrival of a data point $S_i$ is said to be a novel event if it is placed as a single point within a newly created cluster $C_i$. The creation time for cluster $C_i$ is denoted by $t(C_i)$. The event in this case is the story or topic underlying the data point $S_i$ and not the data point itself.

The occurrence of a new event can result as the novel event, but the occurrence can also affect the relative presence of existing data points in the different clusters. For example, the "Mideast Unrest" event can result as either a creation of a new cluster or a significant addition of new data points to the clusters that are most closely related to this topic. This is because it is often possible for previously existing clusters to match closely with a sudden burst of objects related to a particular topic. The sudden burst of objects in an event will be defined an evolution event. An evolution event is confined to a specific time horizon and represents a change in the relative activity for that particular cluster.

In order to determine whether the new event is a novel event or an evolution event, step 103 utilizes a fractional cluster presence function. The fractional cluster presence for cluster $C_i$ in the time period $(t_1, t_2)$ is the fraction of records from the social stream arriving during time period $(t_1, t_2)$, which belong to the cluster $C_i$. This fractional presence is denoted by $F(t_1, t_2, C_i)$. This sudden burst is characterized by a change in fractional presence of data points in clusters, and such burst will define evolutionary event.

Step 103 determines a higher rate at which data points have arrived to the cluster in the previous time window of length H, as compared to the arrival of other data points even before H. Also, parameter a is used as a first threshold value in order to measure this evolution rate. Parameter a can be a predetermined value and can be configured by the user. An evolution event over horizon H at current time $t_c$ is said to have occurred at first threshold value $\alpha$ for cluster $C_i$, if the ratio of the relative presence of points in cluster $C_i$ over the horizon $(t_c-H, t_c)$ to that before time $t_c-H$ is greater than a first threshold value $\alpha$. The following equation is provided below for better understanding:

$$\frac{F(t_c - H, t_c, C_i)}{F(t(C_i), t_c - H, C_i)} \geq \alpha \qquad \text{Equation 1}$$

In Equation 1, it is assumed that $t_c-2\cdot H \geq t(C_i)$, where the value of $t_c-2\cdot H$ is larger than the cluster creation time $t(C_i)$ in order to define the aforementioned evolution ratio. This ensures that at least H units of time are used in the computation of the denominator of this ratio during step 103.

In step 104, an alarm is triggered when the changes in at least one of the clusters exceed a first threshold value. The first threshold value is expressed as parameter $\alpha$ in the embodiment of the present invention, which can be a predetermined value and can be configured by the user. As discussed before, the event detection algorithm uses a time horizon H as the input which is used for the event detection process. In order to perform the event detection, and trigger an alarm whenever ratio $$\frac{F(t_c - H, t_c, C_i)}{F(t(C_i), t_c - H, C_i)}$$

for $C_i$ exceeds the threshold of $\alpha$. This suggests a significant change in the underlying social stream, which is detected by a significant change in the ratios of stream objects being assigned to the different clusters.

Figure 2:
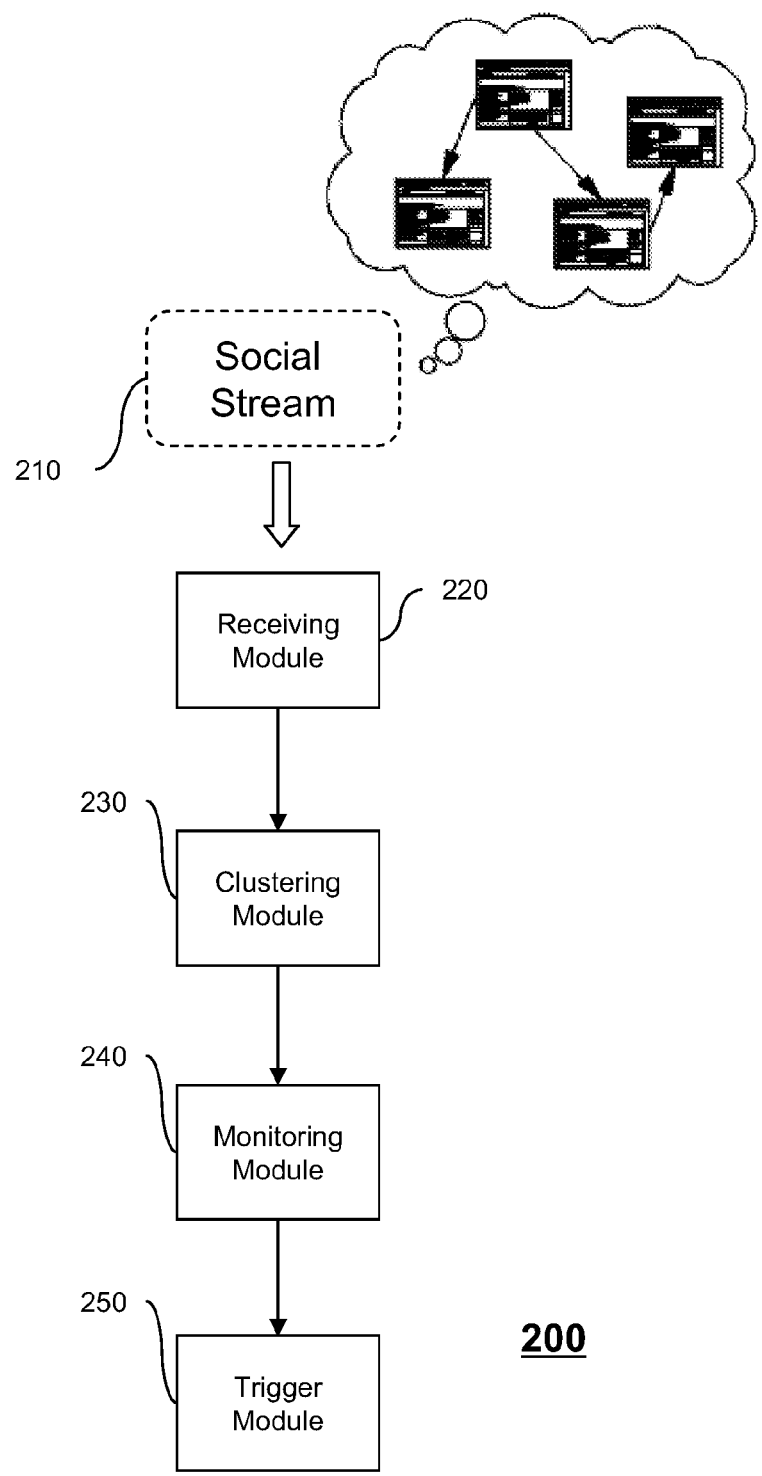
FIG. 2 shows a system for detecting an event in a social network according to a preferred embodiment of the present invention.

FIG. 2 shows a system for detecting an event from a social stream according to an embodiment of the present invention. The system 200 includes a receiving module 220 which receives social stream 210, where social stream includes a continuous and temporal sequence of objects $S_1 \ldots S_r \ldots$, such that each object $S_i$ corresponds to a content-based interaction between social entities, and contains explicit content information and linkage information between entities.

In the embodiment shown in FIG. 2, system 200 also includes a cluster module 230 that continuously partitions objects from the social stream, $S_1 \ldots S_r \ldots$ into k clusters $C_1 \ldots C_k$, such that each object $S_i$ belongs to at most one of the clusters $C_r$. As mentioned above, the clusters are created by utilizing both the content and linkage information. Since the clusters are created dynamically, they can change considerably over time, as the stream evolves, and new points are added to the clusters. Furthermore, in some cases, an incoming object can be different enough from the current clusters. In that case, it can be put into a cluster of its own, and one of the current clusters can be removed from the set $C_1 \ldots C_k$.

In the embodiment shown in FIG. 2, system 200 also includes a monitoring module 240 that monitors changes in the clusters. Monitoring module also determine whether the new event is a novel event or an evolution event by utilizing the fractional cluster presence function described above. System finally includes trigger module 250, where trigger module 250 triggers an alarm when the changes in at least one of the clusters exceed a first threshold value. The first threshold value can be a predetermined value and can be configured by the user.

Figure 3:
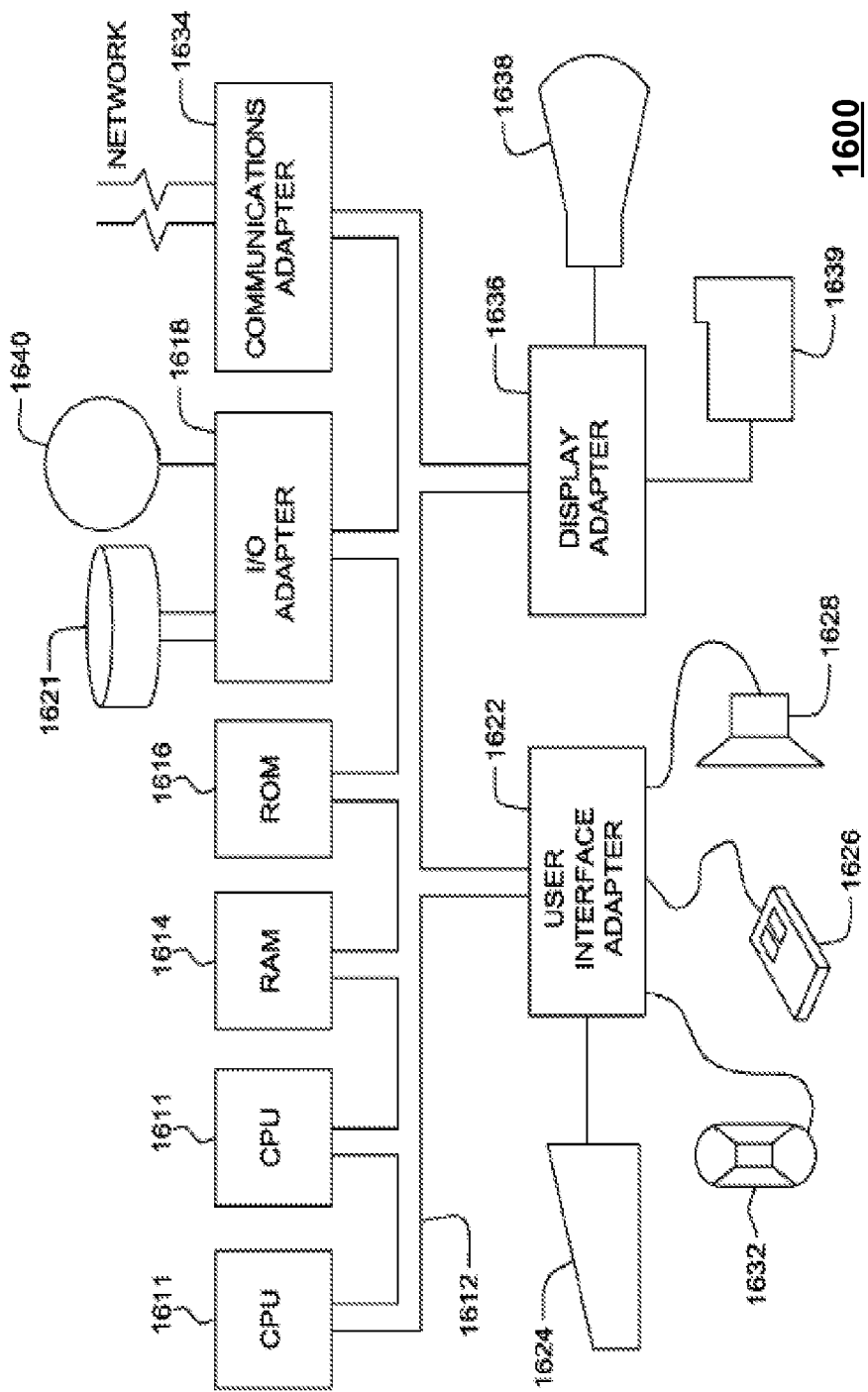
FIG. 3 shows illustrates a hardware configuration to implement or execute at least one embodiment of the present invention.

FIG. 3 illustrates a hardware configuration of computing system 1600 (e.g., receiving module 202, cluster module 203, monitoring module 204, trigger module 205) implementing and/or executing the embodiments of the present invention. Computing system 1600 can include all modules in FIG. 2 in the embodiment of the present invention. The hardware configuration preferably has at least one processor or central processing unit (CPU) 1611. The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting the system 1600 to a data processing network, the Internet, an Intranet, a personal area network (PAN), etc., and a display adapter 1636 for connecting the bus 1612 to a display device 1638 and/or printer 1639 (e.g., a digital printer of the like).

In a further embodiment, the receiving module 202, cluster module 203, monitoring module 204, trigger module 205 are implemented as hardware on a reconfigurable hardware, e.g., FPGA (Field Programmable Gate Array) or CPLD (Complex Programmable Logic Device), using a hardware description language (Verilog, VHDL, Handel-C, or System C). In another embodiment, the topic modeling module 140, the link modeling module 150 and the community modeling module 160 are implemented on a semiconductor chip, e.g., ASIC (Application-Specific Integrated Circuit), using a semi custom design methodology, i.e., designing a chip using standard cells and a hardware description language.

In a further embodiment, receiving module 202, cluster module 203, monitoring module 204, trigger module 205 are implemented as software using one or more programming languages, e.g., C, C++, Java, .NET, Perl, Python, etc. In one embodiment, receiving module 202, cluster module 203, monitoring module 204, trigger module 205 are recorded in a computer readable medium, e.g., CD (Compact Disc), DVD (Digital Versatile Disc), HDD (Hard Disk Drive), SSD (Solid State Drive), as an instruction, e.g., a machine language or assembly language, that is executed by a processor, e.g., Intel®. Core®, IBM® Power PC®, AMD® Opteron®.

Figure 4:
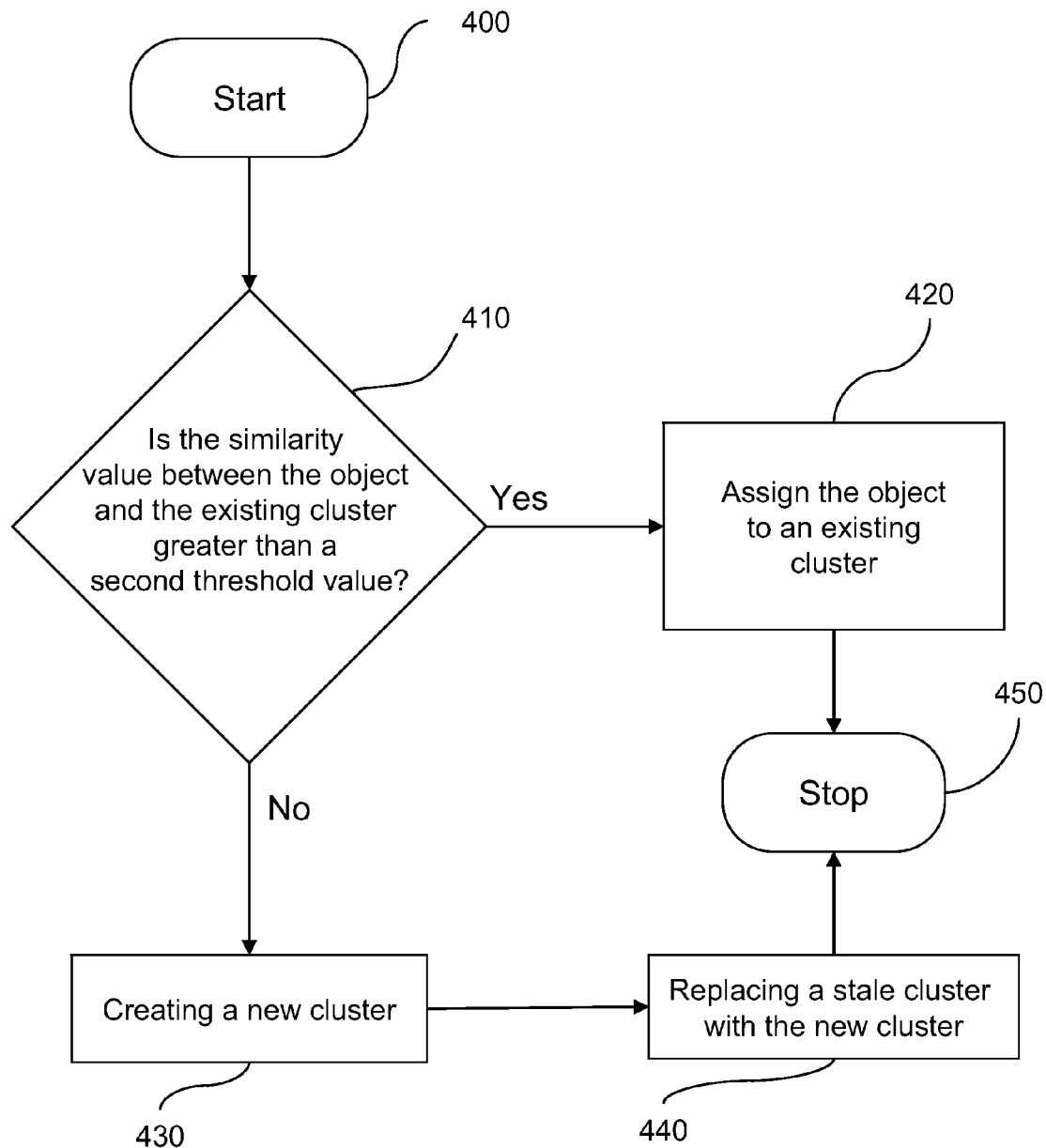
FIG. 4 shows a flow chart illustrating a method for assigning an object to an existing cluster or creating a new cluster during partitioning step 102 according to a preferred embodiment of the present invention.

FIG. 4 illustrates in detail a method for assigning an object to an existing cluster or creating a new cluster during partitioning step 102 according to a preferred embodiment of the present invention. FIG. 4 includes the steps of: assigning said object to an existing cluster if a similarity value between said object and said existing cluster is greater than a second threshold value; creating a new cluster with said object if said similarity value between said object and said existing cluster is less than a second threshold value; and replacing a stale cluster with said new cluster.

In step 410 of FIG. 4, a determination is made whether the similarity value between the object and the existing cluster is greater than a second threshold value. The similarity value between the object $S_i$ and cluster $C_r$ (Sim($S_i$, $C_r$)) is computed from both structural components SimS($S_i$, $C_r$) and content components SimC($S_i$, $C_r$). The content component uses tf-idf based similarity between the text document $T_i$, which corresponds to the content of the interaction of an entity in the social network with $S_i$, and the word summary $W_r$. The structural components are calculated by utilizing the node summary $V_r$ and the nodes $R_i \cup \{q_i\}$ in the social stream. Node summary $V_r$ is the set of nodes associated with the cluster $C_i$, and includes the nodes $j_{i1}, j_{i2} \ldots j_{is}$, together with node frequencies denoted by $v_{i1}, v_{i2} \ldots v_{is}$. $q_i$ is the origination node $q_i \in N$ which is the sender of the message $T_i$ to other nodes. $R_i$ is the set of one or more receiver nodes $R_i \subseteq N$, which correspond to all recipients of the message $T_i$ from node $q_i$. First, $B(S_i)=(b_1, b_2, \ldots b_{s_r})$ is designated as the bit-vector representation of $R_i \cup \{q_i\}$, which has a bit for each node in $V_r$. The bit value is 1, if the corresponding node is included in $R_i \cup \{q_i\}$ and otherwise it is 0. The structural similarity between the object $S_i$ and the frequency-weighted node set of cluster $C_r$ is defined in Equation 2:

$$SimS(S_i, C_r) = \frac{\sum_{t=1}^{S_r} b_t \cdot v_{rt}}{\sqrt{\|R_i \cup \{q_i\}\|} \cdot \left(\sum_{t=1}^{S_r} v_{rt}\right)} \quad \text{Equation 2}$$

For Equation 2, $L_1$-norm of the node-frequency vector in the denominator is used as opposed to the normal use of the $L_2$-norm in order to penalize the creation of clusters which are too large. This will result in more balanced clusters.

After calculation of both structural components SimS($S_i$, $C_r$) and content components SimC($S_i$, $C_r$), similarity value Sim($S_i$, $C_r$) is computed as a linear combination of the structural and content-based similarity values. Equation 3 illustrates the above computation for similarity value Sim($S_i$, $C_r$):

$$Sim(S_i, C_r) = \lambda \cdot SimS(S_i, C_r) + (1-\lambda) \cdot SimC(S_i, C_r) \quad \text{Equation 3:}$$

For Equation 3, parameter $\lambda$ is the balancing parameter, which lies in the range (0, 1). The parameter $\lambda$ is defined by the user.

Continuing on step 410 of FIG. 4, when the similarity value between the object and the existing cluster (Sim($S_i$, $C_r$)) is calculated, it is determined whether the similarity value is greater than a second threshold value. The second threshold value can be a predetermined value by the user or can be a value of $\mu - 3 \cdot \sigma$, where $\mu$ is the mean and $\sigma$ is the standard deviation of all similarity values of incoming stream objects ($S_1 \ldots S_r, \ldots$) to cluster summaries, where the details of cluster summaries will be explained later. In step 420 of FIG. 4, if the similarity value of the closest cluster is above the second threshold value, then incoming stream object $S_i$ is assigned to its closest cluster centroid. On the other hand, in step 430 of FIG. 4, if the similarity of $S_i$ to is less than the second threshold value, a singleton cluster containing only object $S_i$ and corresponding cluster summary statistics is created. Step 440 of FIG. 4 follows by replacing the most stale cluster from the current collection $C_1 \ldots C_k$ with the new singleton cluster. The most stale cluster is defined as the one which was updated the least. In the event that a null cluster exists (which has never been updated), it is automatically considered the most stale cluster. Any ties are broken randomly.

Figure 5:
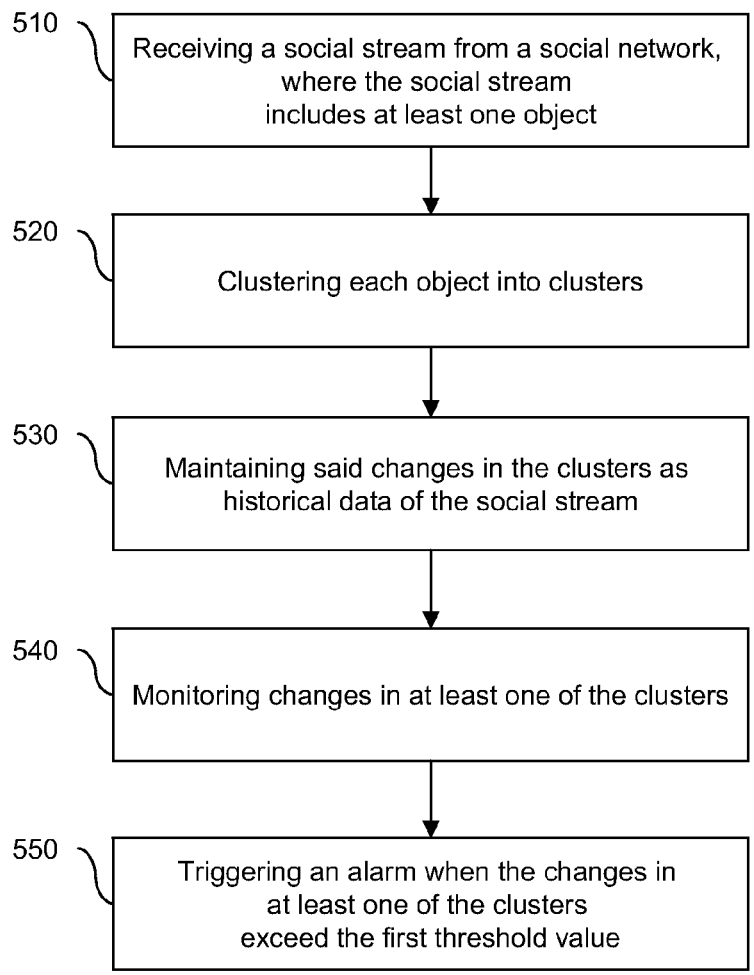
FIG. 5 shows a flow chart illustrating method 500 of maintaining according to another preferred embodiment of the present invention.

FIG. 5 illustrates a flowchart that illustrates the method maintaining the changes in the clusters as historical data of the social stream. Step 530 of FIG. 5 illustrates that the changes in the clusters will be maintained by using a clustering algorithm. It is assumed that the clustering algorithm uses the number of clusters k as an input, and maintains the structural and content information in the underlying clusters in the form of node and word frequencies in the cluster. The clusters are denoted by $C_1 \ldots C_k$. The set of nodes associated with the cluster $C_i$ is denoted by $V_i$, and the set of words associated with it is denoted by $W_i$. The set $V_i$ is referred to as the node summary, whereas the set $W_i$ is referred to as the word summary. The summary characterization can be used for assignment of incoming social stream objects to clusters, which will be described later. The set $V_i$ includes the nodes $j_{i1}, j_{i2} \ldots j_{is}$, together with node frequencies denoted by $v_{i1}, v_{i2} \ldots v_{is}$. The word set $W_i$ includes word identifiers $l_{i1}, l_{i2} \ldots l_{is}$ together with word frequencies denoted by $\phi_{i1}, \phi_{i2} \ldots \phi_{is}$.

The incoming social stream object $S_i$ is maintained together with each cluster summary $\psi_i(C_i)$. The cluster summary $\psi_i(C_i)$ includes a node summary and a content summary. The node summary includes a set of nodes denoted as $V_i = \{j_{i1}, j_{i2} \ldots j_{is}\}$ and a set of corresponding node frequencies denoted as $\eta_i = v_{i1}, v_{i2} \ldots v_{is}$, where the node set $V_i$ is assumed to include $S_i$ nodes. The content summary includes a set of word identifiers denoted as $W_i = \{l_{i1}, l_{i2} \ldots l_{is}\}$ and a set of corresponding word frequencies denoted as $\Phi_i = \phi_{i1}, \phi_{i2} \ldots \phi_{iu}$, where $W_i$ is assumed to contain $u_i$ words. Thus, the cluster summary $\psi_i(C_i)$ is denoted as $\psi_i(C_i) = (V_i, \eta_i, W_i, \Phi_i)$. In the preferred embodiment of the present invention, the set of clusters $C_1 \ldots C_k$ are maintained together with cluster summaries $\psi_1(C_1) \ldots \psi_k(C_k)$. As new social stream objects arrive, the clusters are continuously updated and maintained. At the same time, the changes in the underlying clusters are continuously tracked and maintained in order to raise alarms for new events.

Once object $S_i$ is assigned to its closest cluster centroid $C_r$, the corresponding cluster summary $\psi_r(C_r)$ is updated. Specifically, any new nodes in $S_i$, which are not already included in node summary $V_r$ are added to $V_r$, and the frequency of the nodes of $S_i$ which are included in $V_r$ are incremented by 1. It is noted that the nodes in $S_i$ correspond to both the source node $q_i$ and the destination nodes $R_i$. In other words, the set $R_i \cup \{q_i\}$ is used to update the set $V_r$ and its member frequencies. The same approach is applied to the words in $W_r$ with the use of the words in the social stream object $S_i$. The only difference in this case is that the frequencies of the words are not incremented only by 1, but by their frequency of presence in the underlying document.

Step 530 of FIG. 5 also maintains the mean and standard deviation of the (closest) similarity values of the incoming objects to the clusters as historical data. For this purpose, the present embodiment maintains the zeroth, first and second order moments $M_0$, $M_1$ and $M_2$ of the closest similarity values continuously. These values can be easily maintained in the stream scenario, because they can be additively maintained over the data stream. The mean $\mu$ and standard deviation $\sigma$ can be expressed in terms of these moments as follows:

$$\mu = M_1/M_0, \sigma = \sqrt{M_2/M_0 - (M_1/M_0)^2} \quad \text{Equation 4:}$$

The detailed overall algorithm for cluster maintenance is illustrated in FIG. 6. The historical data can be used in monitoring the changes in at least one of the clusters, which is shown in step 103 of FIG. 1. The historical data can further be created and maintained from the results of assigning an object to an existing cluster or creating a new cluster, which is shown in FIG. 4. The historical data can be used in supervised event detection, in which the historical data becomes available in order to guide the event detection process.

In cases of supervised event detection, it is assumed that there is access to the past history of the stream in which the event ϵ has been known to have occurred. In addition, there is information about at least a subset of the social stream tweets which are relevant to this particular event. This is the ground truth which can be leveraged for more accurate event detection.

In order to perform supervised event detection, there are changes to the clustering portion of the algorithm as well. One major change is that replacement of old clusters or creation of new clusters is not allowed when a new incoming point does not naturally fit in any cluster. Rather, it is always assigned to its closest cluster, with any ties broken randomly. This is done in order to provide stability to the clustering characteristics, and is essential for characterizing the events in a consistent way over time with respect to the clusters in the underlying data.

The relative distribution of event-specific stream objects to clusters is used as a signature which is specific to the event. These can be used in order to perform the detection in real time. The assumption in the supervised case is that the training data about the social stream objects which are related to the event are available in the historical training data. The signature of the event ϵ is defined as an event signature or a horizon signature.

The event signature of a social stream is a k-dimensional vector $V(\epsilon)$ containing the (average) relative distribution of event-specific stream objects to clusters. In other words, the ith component of $V(\epsilon)$ is the fraction of event-specific (training) stream objects which are assigned cluster i.

The event signature provides a useful characterization of the relative topical distribution during an event of significance. For example, during a period of mideast unrest (the event ϵ), some clusters are likely to be much more active than others, and this can be captured in the vector $V(\epsilon)$, as long as ground truth is available to do so. The event signatures can be compared to horizon signatures, which are essentially defined in the same way as the event signatures, except that they are defined over the more recent time horizon $(t_c-H, t_c)$ of length H.

The horizon signature, which is another type of signature of an event, over the last time period $(t_c-H, t_c)$ is a k-dimensional vector containing the relative distribution of social stream objects to clusters which have arrived in the period $(t_c-H, t_c)$.

In order to perform the supervised event detection, the dot product of the horizon signature with the known event signature (which was computed by the ground truth) and output an alarm level that is equal to this value are calculated. The tradeoff between false positives and false negatives is determined by the threshold chosen to decide when such an event has really occurred.

The main challenge of this algorithm is that node based statistics can be rather large. As a result, the corresponding similarity computations and maintenance can be cumbersome. For example, the number of nodes in $V_r$ can be of the order of tens of millions and this can make the algorithm extremely slow. Thus, a sketch-based technique is designed in order to speed up the computations.

Sketch based technique is a natural method for compressing the counting information in the underlying data so that the broad characteristics of the dominant counts can be maintained in a space-efficient way. In this embodiment of the present invention, count-min sketch is applied for maintaining node counts in the underlying clusters. In the count-min sketch, a hashing approach is utilized in order to keep track of the node counts in the underlying data stream. Function $w=\lceil \ln(1/\delta) \rceil$ is used pairwise independent hash functions. Each of independent hash functions maps onto uniformly random integers in the range $h=[0, e/\epsilon]$, where e is the base of the natural logarithm. The data structure includes a two dimensional array with w·h cells with a length of h and width of w. Each hash function corresponds to one of w 1-dimensional arrays with h cells each. In standard applications of the count-min sketch, the hash functions are used in order to update the counts of the different cells in this 2-dimensional data structure. For example, consider a 1-dimensional data stream with elements drawn from a massive set of domain values. For example, in the embodiment of the present invention, this domain of values corresponds to the different node identifiers in the social network. When a new element of the data stream is received, each of the w hash functions is applied to map onto a number in [0 . . . h−1]. The count of each of the set of w cells is incremented by 1. In order to estimate the count of an item, we determine the set of w cells to which each of the w hash-functions map, and compute the minimum value among all these cells. Let $c_i$ be the true value of the count being estimated. It is noted that the estimated count is at least equal to $c_i$, since only non-negative counts are dealt, and there can be an over-estimation because of collisions among hash cells. As it turns out, a probabilistic upper bound to the estimate can also be determined. It has been shown, that for a data stream with T arrivals, the estimate is at most $c_i+\epsilon \cdot T$ with probability at least $1-\delta$.

In order to use the count-min sketch for improving the node-count estimation process, we maintain a sketch table for each cluster in the data. The sketch table is used for the purpose of maintaining the frequency counts of the nodes in the incoming data stream. Specifically, the sketch table for the jth cluster is denoted by $U_j$. If desired, we can use the same set of w hash functions for the different clusters. The main condition is that the set of w hash functions should be independent of one another. For each incoming object $S_i$, the sketch table for the cluster is updated, where the cluster is assigned to the sketch table on the basis of the similarity measure. The w different hash functions is applied to the (string representation of the identifier of the) nodes in $R_i \cup \{q_i\}$, and add 1 to the counts of the corresponding cells. Thus, for the incoming object $R_i$, each of hash functions is needed to apply to the different $|R_i|=1$ nodes, and update the corresponding cells. This corresponds to an application of $(|R_i|+1) \cdot w$ hash function instantiations and corresponding cell updates.

In addition, the sketch-based structure can also be used to effectively estimate the similarity value $SimS(S_i, C_r)$. We note that this similarity computation needs to be performed for each cluster $C_r$, and its corresponding sketch table $U_r$ in order to determine the closest cluster to the incoming object based on the composite similarity measure. The denominator of $SimS(S_i, C_r)$ can be exactly estimated, because the object $S_i$ is known, and therefore the value of $\sqrt{R_i \cup \{q_i\}}$ can also be determined. The value of $\Sigma_{r=1}^{S_r} v_{rt}$ can also be determined, because the value is equal to the sum of all values in the sketch table cells in $U_r$ for any one of the w hash functions. Thus, this value can be obtained exactly by summing up the h cells for any particular one of the hash functions. On the other hand, the numerator needs to be estimated approximately. Note that the numerator is essentially defined by the sum of the estimated values of the frequencies of the nodes included in $R_i \cup \{q_i\}$.

The frequency of each such node can be estimated. Specifically, for each node included in $R_i \cup \{q_i\}$, the corresponding cluster-specific frequency of the node can be obtained by applying the hash function to the identifier of each node. It is noted that the value of the corresponding hash cell will always be an overestimate because of collisions between the different node identifiers to the same hash cell. Therefore, the minimum of these values across the w different hash functions will also be an overestimate, though it will be much tighter and more robust because of the use of different hash functions. We sum up these estimated frequency values over the different nodes in $R_i \cup \{q_i\}$. This is essentially the estimate of the numerator. This estimation of the numerator can be used in conjunction with the exact knowledge about the different denominator values in order to create an estimate of $SimS(S_i, C_r)$. Let $EstSimS(S_i, C_r)$ represent the estimated similarity of $S_i$ to $C_r$ with the use of the sketch-based approach. Then, we can show the following result:

Lemma 1: If a sketch-table with length h and width w is used, then for some small value $\epsilon > \sqrt{|R_i|+1}/h$, the estimated value of the similarity $EstSimS(S_i, C_r)$ is bounded to the following range with probability at least $$1 - \left(\frac{\sqrt{|R_i|+1}}{h \cdot \epsilon}\right)^w :$$

$$SimS(S_i, C_r) \leq EstSimS(S_i, C_r) \leq SimS(S_i, C_r) + \epsilon \qquad \text{Equation 5:}$$

Proof: As discussed earlier in Equation 2, the structural similarity is given by the following equation:

$$SimS(S_i, C_r) = \frac{\sum_{t=1}^{S_r} b_t \cdot v_{rt}}{\sqrt{\|R_i \cup \{q_i\}\|} \cdot \left(\sum_{t=1}^{S_r} v_{rt}\right)} \qquad \text{Equation 6}$$

It is noted that the numerator is (over)-estimated approximately with the use of the sketch-based process, whereas the denominator can be known exactly. It is evident that $SimS(S_i, C_r) \leq EstSimS(S_i, C_r)$, due to the over-estimation of the numerator. It remains to show that $EstSimS(S_i, C_r) \leq SimS(S_i, C_r) + \epsilon$ with probability at least $$1 - \left(\frac{\sqrt{|R_i|+1}}{h \cdot \epsilon}\right)^w.$$

Let $SimSN(S_i, C_r)$ and $EstSimSN(S_i, C_r)$ be the estimation of the numerator with the sketch-based approach. Then, since the denominator can be computed exactly, we have:

$$EstSimS(S_i, C_r) = \frac{EstSimSN(S_i, C_r)}{\sqrt{|R_i|+1} \cdot \left(\sum_{t=1}^{S_r} v_{rt}\right)} \qquad \text{Equation 7}$$

Furthermore, we have:

$$SimS(S_i, C_r) = \frac{SimSN(S_i, C_r)}{\sqrt{|R_i|+1} \cdot \left(\sum_{t=1}^{S_r} v_{rt}\right)} \qquad \text{Equation 8}$$

Therefore, in order to prove the result in the lemma, bounds on the approximation in the numerator need to be proven. Specifically, it is needed to prove that the following holds true with probability at least $$1 - \left(\frac{\sqrt{|R_i|+1}}{h \cdot \epsilon}\right)^w.$$

$$EstSimSN(S_i, C_r) \leq SimSN(S_i, C_r) + \epsilon \cdot \sqrt{|R_i|+1} \cdot \left(\sum_{t=1}^{S_r} v_{rt}\right) \qquad \text{Equation 9}$$

Let $\epsilon \cdot \sqrt{|R_i|+1} \cdot \left(\sum_{t=1}^{S_r} v_{rt}\right)$ of Equation 9 be substituted as B. As with Equation 9, one needs to show the above bound on the probability for the condition that:

$$EstSimSN(S_i, C_r) - SimSN(S_i, C_r) \leq B \qquad \text{Equation 10:}$$

The expected value of the $EstSimSN(S_i, C_r) - SimSN(S_i, C_r)$ with the use of any particular hash function is $(|R_i|+1) \cdot (\sum_{t=1}^{S_r} v_{rt})/h$. This result occurs because one needs to sum up the errors over $|R_i|+1$ different frequency estimations, and the expected number of collisions for any of these cell-based estimations is $(\sum_{t=1}^{S_r} v_{rt})/h$. Then, we can use the Markov inequality to show that the probability that the condition in Equation 10 is violated with the use of 1 hash function with probability at most $$\frac{(|R_i|+1) \cdot \left(\sum_{t=1}^{S_r} v_{rt}\right)/h}{B \cdot h}.$$

One can generalize the probability of this to w independent hash functions to at most $$\left(\frac{(|R_i|+1) \cdot \left(\sum_{t=1}^{S_r} v_{rt}\right)}{B \cdot h}\right)^w.$$

Therefore, the condition in Equation 10 holds with probability at least $$1 - \left(\frac{(|R_i|+1) \cdot \left(\sum_{t=1}^{S_r} v_{rt}\right)}{B \cdot h}\right)^w.$$

By substituting the value of B in the above equation, one can obtain the desired result.

The above result suggests that the value of the similarity can be estimated quite accurately with the use of modest memory requirements of a sketch table. For example, consider a tweet with $|R| \approx 100$, and a similarity estimation bound of $\epsilon = 0.001$. If one uses a sketch table with h=200,000 and w=5 (typical values), it will require a storage of only 1 million cells, which is in the megabyte order. The similarity estimate lies within $\epsilon = 0.001$ of the true value with probability at least $1-(1/20)^5 > 1-10^{-6}$. In practice, since these theoretical bounds are quite loose, the estimates are much better.

The following paragraphs will discuss about the effectiveness and efficiency of the embodiments of the present invention. Two real data sets were used as examples to evaluate the effectiveness of the embodiments of the present invention.

The algorithm was tested on the following two data sets. The first set is Twitter® Social Stream, which is a stream of tweets which was crawled from the Twitter® social network. Each social object contains the network structure and content in a tweet. Specifically each object contained the text of the tweet, and the sender and receivers of the tweet. The tweets were collected for a period between May 9, 2011 05:00 GMT and May 10, 2011 18:30 GMT. The tweets were extracted using the Twitter® garden hose streaming API available using the Twitter4j library (http://dev.twitter.com/docs/twitter-libraries). The stream contained a total of 1,628,779 tweets, which were distributed over a total of 47,351,520 nodes. The nodes include the sender and the receivers either in the form of direct mentions from senders or their followers in the case of broadcast messages. While extracting the followers, the experiment included only users who follow fewer than 1,000 other people, and have fewer than 1,000 followers. Kwak et al. indicates dramatic shifts in behavior among users with social graph degrees outside this range; such users may be marketers, celebrities with professional publicists, news media sources, and are therefore atypical of the general population. The experiment also eliminated short URLs, stop words and emoticons for each of the received tweets. On average each stream object contained about 84 nodes per tweet.

The second example set is Enron Email Stream, which is an Enron email data set that was converted to a stream with the use of the time stamp information in the emails. Each object contained the text of the email, and the network structure corresponding to the sender and receiver(s). In this sense, the network structure of an email is very similar to a tweet with a single sender and multiple receivers. The Enron email data stream contained a total of 517,432 emails. The example eliminated emails that did not have valid sender and receiver email identifiers. The example also filtered out the calendar invites, duplicate emails and email history at the bottom of each email. The total emails after the filtering process were 349,911, where the emails were distributed over a total of 29,083 individuals. On the average, each email contained 3.62 receivers.

Both data sets were tested for clustering and event detection methods, and were further tested for effectiveness. For the case of efficiency, only clustering method was used, because the majority of the time for event detection was spent in the clustering process. In order to test the effectiveness, the experiments used a number of class labels which were associated with the objects in the social stream. For the Twitter® stream, these class labels were the hash tags which were associated with the tweet. The most frequent hash tags in the stream often correspond to events in the stream such as the Japan Earthquake, and represent meaningful characteristics of the underlying objects which ought to be clustered together. These hash tags also often represent the meaningful events in the stream. It is noted that not every tweet may contain hash tags, and therefore, the hash tags were only associated with a subset of the tweets. For the case of the Enron email stream, the class labels were defined by the most frequently occurring tokens in the subject line. These tokens were as follows:

meeting, agreement, gas, energy, power, report, update, request, conference, letter, deal, credit, california, trading, contract, project, presentation, houston, announcement All emails which contained any of the above tokens in the subject line were tagged with the corresponding class label. Thus, for both data streams, a subset of the stream objects was tagged with a class label. Clearly, clusters of high quality would tend to put objects with similar tags in the same cluster. Therefore, the dominant class purity of each cluster was computed. Each cluster was tagged with the highest presence, and computed the fraction of the (tagged) cluster objects, which belonged to that label. This value was averaged over the different clusters in a weighted way, where the weight of a cluster was proportional to the number of (tagged) objects in it.

Efficiency of the social stream clustering process was also tested. In order to test efficiency, the number of social stream objects processed per unit of time was computed, and the number for the different algorithms was presented.

The effectiveness of the event detection algorithm was tested. For cases involving the unsupervised algorithm, a case study is presented to illustrate the interesting events found by the technique. This provides an intuitive idea about the effectiveness of the technique. On the other hand, supervised algorithm needs to generate the ground truth. For this purpose, hash tags were used in the Twitter Stream in order to generate a 0-1 bit stream corresponding to when the events actually occurred. A hash tag corresponding to #japan was used in order to generate the events in the Twitter data stream. Specifically, at each time stamp, we monitored at the past window of length h and counted the number of occurrences of a particular hash tag in that window. If the number of occurrences of the hash tag was at least 3, then a bit of 1 at that time stamp was generated to indicate that the event has indeed occurred.

The supervised event detection algorithm generates a continuous alarm level. It is possible to use a threshold t on this continuous alarm level in order to generate a 0-1 bit stream corresponding to the algorithmic prediction of when the event has occurred. By using different thresholds t on this alarm level, one can obtain different tradeoffs between precision and recall. Let $S_F(t)$ be the set of time stamps at which an alarm is generated with the use of threshold value of t on the real alarm level. Let $S_G$ be the ground truth set of time stamps at which the event truly occurs. Then, Precision(t) and Recall(t) can be computed as follows:

$$Precisiont(t) = \frac{|S_F(t) \cap S_G|}{S_F(t)} \quad \text{Equation 11}$$

$$Recall(t) = \frac{S_F(t) \cap S_G}{S_G} \quad \text{Equation 12}$$

A plot between precision and recall were drawn by varying the value of t and exploring the tradeoff between precision and recall with the use of different thresholds on the generated alarm level. The higher the curve, the better the quality of the result.

Different algorithm settings were tested to determine the effect of content and network structure on accuracy and efficiency. By setting λ to the extreme values of 0 and 1, one can test how well the algorithm performs. The performance review can be tested either the network-only algorithm or the text-only algorithm for the clustering process. A combination scheme was also tested in which the value of λ was set to 0.5. The above-mentioned scheme provides equal weight to the text and content in the clustering and event detection process. For the combination scheme, we tested the algorithm with sketch technique and without the sketch technique, in order to estimate the accuracy and efficiency of the effects of sketch use on the scheme. Therefore, the variation also serves as a good baseline, because the use of pure text content is the only natural alternative for this problem at this juncture.

Figure 7:
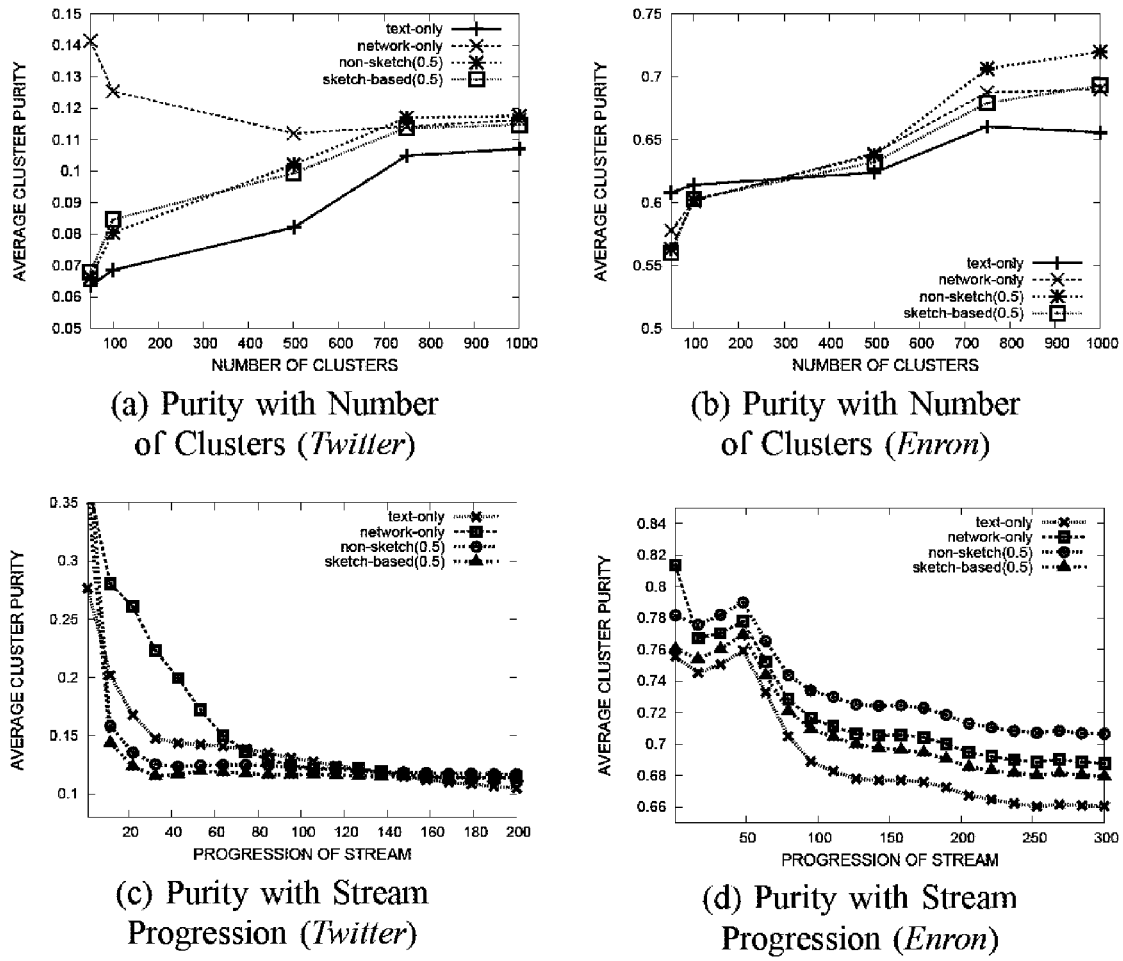
FIG. 7 illustrates the effectiveness results of the clustering algorithm in terms of the cluster purity according to a preferred embodiment of the present invention.

FIG. 7 illustrates the effectiveness results of the clustering algorithm in terms of the cluster purity. The effectiveness of the approach was further tested with increasing number of clusters. The results for the Twitter and Enron streams are illustrated in FIGS. 7(a) and 7(b) respectively. The sketch table length h was set to 262,213, whereas the sketch table width w was set to 2 for the Twitter social stream, and these values were set to 16,369 and 2 for the Enron data stream. In each case, the number of clusters on the X-axis and the cluster purity on the Y-axis were illustrated.

A trend was observed for both the data sets in terms of the relative performance of the different algorithms. In all cases, the algorithm which used only text performed the worst among all the algorithms. The trends between the purely network-based approach and combined approach were dependent upon the level of granularity at which the clustering was performed. For both data streams, it was found that when a small number of clusters were used, the network-based approach was superior. When a larger number of clusters were used, the combination methods outperformed the purely network-based approach. This is because the network locality information is sufficient to effectively partition the clusters when granularity is relatively coarse. In such cases, the addition of text does not improve the quality of the underlying clusters, and can even be detrimental to clustering quality. However, when the number of clusters increases, the combination approach tends to perform better, because the granularity of the clusters is much higher, and as a result more attributes are required to distinguish between the different clusters. This is particularly evident in the case of the Enron data stream, in which the gap between the combination-approach and purely network-based approach is rather large. In all cases, it was found that the use of sketches lead to some loss of accuracy. However, this loss of accuracy is not very significant, especially when it is considered that the sketch-based approach was significantly faster. It is also important to note that the pure text-based approach (which is the baseline) performed the worst in all scenarios.

These results also seem to suggest that the network information in the social stream provides much more powerful information for clustering as compared to the text-information. This is not particularly surprising for sources such as the Twitter data stream in which the text is rather noisy and often contains non-standard acronyms or other text which are hard to use in a meaningful way. However, it was found it somewhat interesting and surprising that these trends were also true for a source such as the Enron data stream, in which the text was relatively clean and was usually quite informative for the underlying class labels.

The cluster purity was also illustrated with progression of the stream. This provides a dynamic idea of how the clustering process performed during the progression of the stream itself. FIGS. 7(c) and 7(d) show the results for the Twitter and Enron data streams. The number of clusters was fixed to 750. For the Twitter data stream the sketch table length h was fixed to 262,213, and for Enron the sketch table length was set to 16,369. The sketch table width w was fixed to 2 in both cases. The X-axis illustrates the progression of the stream for every 1000 objects processed, and the Y-axis illustrates the cluster purity in the last time window of 1 hour. The relative trends between the different methods are similar to the earlier observations, though the main observation is that the cluster purities generally reduce with progression of the stream. The reason is because the number of class labels in the stream generally increase over the progression of the stream as new classes, tags and events are encountered. As a result, the cluster purity generally decreases with stream progression.

Finally, FIGS. 7(e) and 7(f) test the sensitivity of the approach with sketch-table length and width. The sensitivity results with increasing sketch-table length for the Twitter and Enron data streams are illustrated in FIGS. 7(e) and 7(f) respectively. The sketch table length is illustrated on the X-axis, whereas the cluster purity is illustrated on the Y-axis. The number of clusters was set to 500 in this case and sketch table width was set to 2. In order to provide a baseline for the relative effectiveness of the incorporation of the sketch structure, results were also shown for the method that does not use the sketch in the same figure. It is clear that the cluster-purity increases with increasing sketch-table length. This is because a larger sketch-table length reduces the number of collisions in the sketch table, and it therefore improves the overall accuracy. In addition, when sketch-table length is increased sufficiently, the accuracy of the approach based on the sketch-table approaches the accuracy of the method which does not use the sketch table. In such cases, the collisions are reduced sufficiently to the point that there of reduction in accuracy because of the sketch table use.

FIGS. 7(g) and 7(h) test and show the sensitivity results with increasing sketch-table width for the Twitter and Enron data streams. The number of clusters was set to 500 and sketch-table length was set to 262,213 for Twitter and 16,369 for Enron data streams respectively. Although the effectiveness results improve with increasing sketch-table width, the purity results were not as sensitive to sketch-table width compared to the sketch-table length. This is because though an increase in the number of hash functions provides additional robustness, it does not drastically reduce the number of collisions between the different items.

Figure 8:
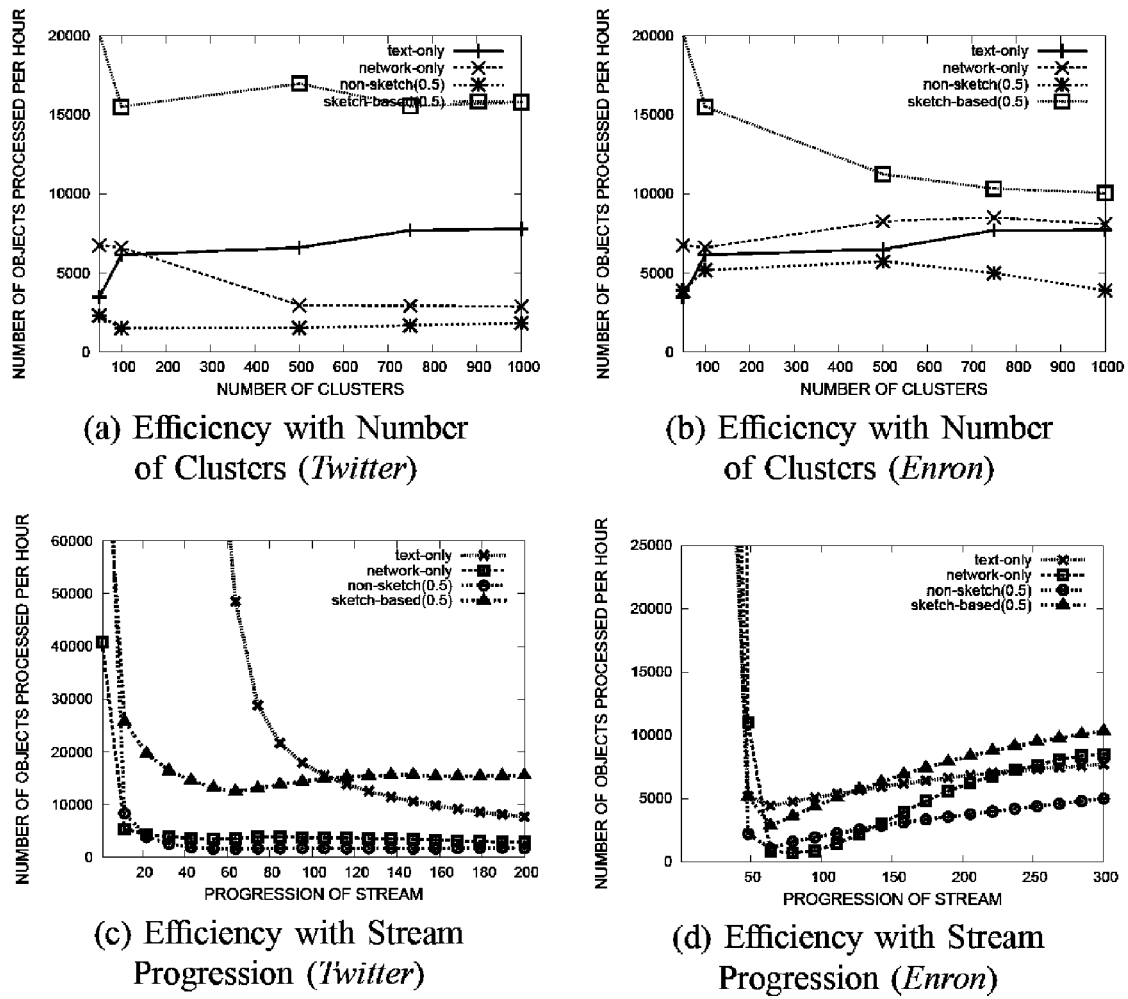
FIG. 8 shows the efficiency of the clustering approach with increasing number of clusters according to a preferred embodiment of the present invention.

FIG. 8 shows the efficiency of the clustering approach with increasing number of clusters. The parameter settings were the same as those of the effectiveness results. FIGS. 8(a) and (b) also show the efficiency results for the Twitter and Enron data streams. The X-axis denotes the number of clusters, whereas the Y-axis denotes the number of stream objects processed every hour. The result shows that the network-based approach was slower than the text-based approach. This is because a large number of distinct nodes were needed to be processed by a text-based approach. However, the sketch-based approach significantly increased the speed in both data streams, because the numbers of operations in the similarity computation were reduced by the sketch representation. In addition, the processing rate did not necessarily decrease with increasing number of clusters, because the larger number of clusters, which resulted in sparser clusters with fewer numbers of objects in each cluster, showed faster similarity computations between the incoming objects and the underlying clusters.

FIGS. 8(c) and 8(d) show the results of the efficiency with stream progression. The stream progression is illustrated on the X-axis, and the processing rate is illustrated on the Y-axis. FIGS. 8(c) and 8(d) illustrate that the processing rate reduces with stream progression for all the different methods, because the clusters contain a larger number of objects with progression of the stream. This increases the complexity of the similarity computations because the number of attributes in each cluster (in terms of the number of text words or nodes) increases as well. However, the slow-down of the method levels out after a certain point as the number of attributes in each cluster stabilizes.

FIGS. 8(e), 8(f), 8(g), and 8(h) show the sensitivity of the approach with hash-table length and width. The sensitivity results with hash-table length and width for the two data streams are also illustrated in FIGS. 8(e), 8(f), 8(g), and 8(h). It is evident from the figures that the running time is not very sensitive to the hash table length, and most of the variations are really random variations. On the other hand, the hash table width affects the number of hash functions which need to be computed. Therefore, the running time generally decreases with increasing hash table width. These results seem to suggest that a greater hash table width is not particularly useful because it does not affect the purity very much, but it substantially affects the efficiency. Therefore, additional memory should be used for increasing hash table length rather than using the additional memory for the width.

In addition, we provide a case study of the unsupervised event detection problem. Both evolutionary and novel events were detected with the use of this approach. Typically, such events were associated with a particular news, country, language or mood.

The first event is related to the Japan nuclear crisis. In particular, the relevant segment of the social stream corresponds to the case where the Japanese Prime Minister requested the Chubu electric company to shut down the Hamaoka nuclear plant. This event generated considerable chatter in the social stream, in which the underlying actors were discussing the positives and negatives of this directive. The corresponding portion of the social stream contained structural nodes which were geographically biased towards Japan, and generally created clusters of their own on the basis of the underlying network and content information. The frequent text content in these clusters included the following words:

nuclear, hamaoka, plant, concerns, dilemma, gaswat, hairline, halt, shut, heavy, japan, neglect, operation (1.152)

One interesting aspect of the algorithm was that it was able to detect events, for which the content was in a foreign language. The reason for this is that the event detection algorithm does not use any methods which are specific to English, and the use of network structure is blind to the use of a specific language. For example, the minister for finance in Indonesia issued an order on May 9, 2011 to buy 7% of the shares in PT Newmont Nusa Tenggara company. This triggered discussion threads in twitter which were captured because of their related content and network structure. The frequent text-content which was associated in the cluster most related to this event was the following:

keputusan, menkeu, bell, newmont, saham, wapres, didukung, challenge, minskade, metro, jak, kimiad, menos, minskade (0.9964)

In the foregoing example, the entire text content in this event consists of foreign language words.

As seen above, the unsupervised event detection approach was capable of discovering interesting and novel events in the underlying social stream. Such inference can be very useful in diagnosing important social moods which are related to real events.

Figure 9:
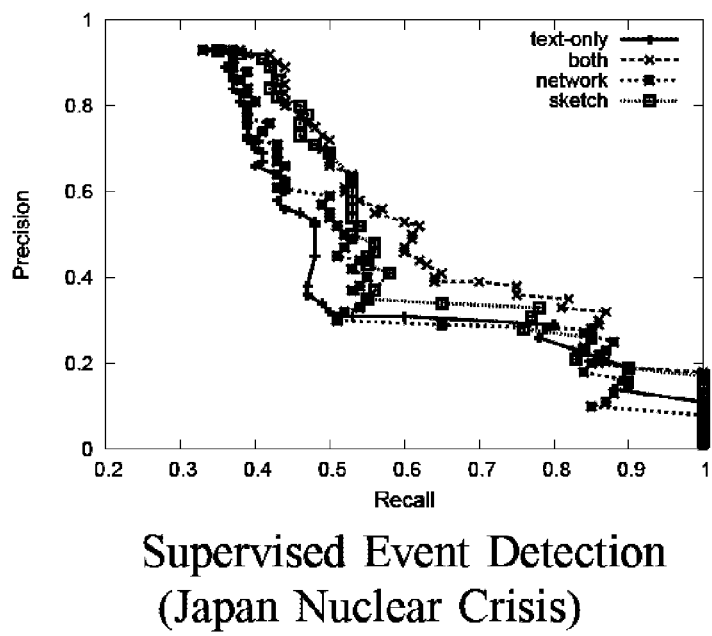
FIG. 9 illustrates the results of the supervised event detection method according to a preferred embodiment of the present invention.

FIG. 9 illustrates the results of the supervised event detection method on the Twitter stream. To create the supervised events, we set the horizon to 5 minutes and determined the periods in which events corresponding to the Japan Nuclear Crisis occurred in the data stream. In each case, we set the number of clusters to 750 in order to detect the underlying events. FIG. 9 illustrates in detail the tradeoff between the precision and recall. The recall is illustrated on the X-axis, whereas the precision is illustrated on the Y-axis. In each case, the event detection algorithm has been implemented with different variations of the algorithm. It is clear that the use of only text provided less accurate event detection than all the methods that used network structure in the event detection process. In particular, the method that used both the network structure and the text content provided the most accurate results. The use of sketches degraded the accuracy of the detection to some extent, but the approach was still more accurate than event detection involving pure text. It is also evident that the absolute values of precision and recall were fairly high. For example, in the case of Japan Nuclear event, a precision of 0.525 was obtained at a recall point of approximately 0.62, when both network and text were used. On the other hand, the scheme which used only either text or network achieved a precision of about 0.3 at a recall point of around 0.6.

Thus, the use of a combination of network and text greatly improved the accuracy of the event detection algorithm. These results seem to suggest that the approach of combining network and text content for clustering and event detection can provide useful and accurate results in a wide variety of scenarios.

What is claimed is:

1. A method for detecting an event from a social stream, the method comprising the steps of:
   receiving a social stream from a social networks;
   wherein said social stream comprises at least one object; and
   wherein said object comprises a text, sender information of said text, and recipient information of said text;
   clustering each object;
   monitoring changes in at least one of said clusters; and
   triggering an alarm when said changes in at least one of said clusters exceed a first threshold value;
   assigning said object to an existing cluster if a similarity value between said object and said existing cluster is greater than a second threshold value;
   creating a new cluster with said object if said similarity value between said object and said existing cluster is less than a second threshold value; and
   replacing a stale cluster with said new cluster;
   wherein said similarity value is determined by calculating a structural similarity value and a value selected from a group consisting of content-based similarity value, temporal similarity value and combinations thereof,
   wherein said structural similarity value is calculated by using structural components of said social network; and
   wherein said structural components comprises nodes and node frequencies;
   wherein at least one of the steps is carried out using a computer device.

2. The method according to claim 1, wherein said second threshold value is calculated from mean and standard deviation of said similarity value.

3. The method according to claim 1, further comprising the step of:
   maintaining said changes in said clusters as historical data of said social stream.

4. The method according to claim 3, wherein said historical data is used for supervised event detection.

5. The method according to claim 4, wherein said step of triggering an alarm further comprises the step of:
utilizing an event signature and a horizon signature.

6. The method according to claim 3, wherein said step maintaining uses a sketch-based technique.

7. The method according to claim 6, wherein said sketch-based technique is used to estimate a structural similarity value between said object and said clusters.

8. A system for detecting an event from a social stream, the system comprising:
a memory;
a processor communicatively coupled to the memory, and a receiving module for receiving a social stream from a social network, communicatively coupled to the memory and the processor, wherein the receiving module is configured to perform the steps of a method comprising:
wherein said social stream comprises at least one object; and
wherein said object comprises a text, sender information of said text, and recipient information of said text;
clustering each object;
a monitoring module for monitoring changes in at least one of said clusters; and
a trigger module for triggering an alarm when said changes in at least one of said clusters exceed a first threshold value;
an existing cluster module for assigning said object to an existing cluster if a similarity value between said object and said existing cluster is greater than a second threshold value;
a new cluster module for creating a new cluster with said object if said similarity value between said object and said existing cluster is less than a second threshold value; and
a replacement module for replacing a stale cluster with said new cluster
wherein said similarity value is determined by calculating a structural similarity value and a value selected from a group consisting of content-based similarity value, temporal similarity value and combinations thereof,
wherein said structural similarity value is calculated by using structural components said social network; and
wherein said structural components comprises nodes and node frequencies.

9. The system according to claim 8, wherein said second threshold value is calculated from mean and standard deviation of said similarity value.

10. The system according to claim 8, further comprising:
a maintenance module for maintaining said changes in said clusters as historical data of said social stream.

11. The system according to claim 10, wherein said historical data is used for supervised event detection.

12. The system according to claim 11, wherein said trigger module further comprises:
a signature module for utilizing an event signature and a horizon signature.

13. The system according to claim 10, wherein said maintenance module uses a sketch-based technique.

14. The system according to claim 13, wherein said sketch-based technique is used to estimate a structural similarity value between said object and said clusters.

15. A non-transitory computer readable storage medium tangibly embodying a computer readable program code having computer readable instructions which when implemented, cause a computer to carry out the steps of claim 1.

* * * * *